United States Patent

Hilpert et al.

[11] Patent Number: 4,542,393
[45] Date of Patent: Sep. 17, 1985

[54] PRINT HEAD FOR AN ELECTROEROSION PRINTER

[75] Inventors: Fritz Hilpert, Boeblingen; Erich Kohm, Schoenaich; Volker Rudolph, Aidlingen; Manfred Wohnsdorf, Boeblingen, all of Fed. Rep. of Germany

[73] Assignee: International Business Machines Corporation, Armonk, N.Y.

[21] Appl. No.: 496,759

[22] Filed: May 20, 1983

[30] Foreign Application Priority Data

Jun. 4, 1982 [EP] European Pat. Off. ........ 82104904.6

[51] Int. Cl.[4] .......................................... G01D 15/08
[52] U.S. Cl. .................... 346/163; 346/155; 346/139 C
[58] Field of Search ..................... 346/155, 162–164, 346/139 C; 219/124.02; 204/2

[56] References Cited

U.S. PATENT DOCUMENTS 4,063,255 12/1977 Bahr et al. ...................... 346/139 C
4,157,554  6/1979 Bahr et al. ...................... 346/162 X
4,435,631  3/1984 Drouet et al. ................. 219/124.02

FOREIGN PATENT DOCUMENTS 53-138337 12/1978 Japan ............................. 346/153.1
56-29258   3/1981 Japan ............................. 346/139 C
56-57043  10/1982 Japan ............................ 219/124.02

Primary Examiner—Thomas H. Tarcza
Assistant Examiner—Fred L. Kampe
Attorney, Agent, or Firm—Kenneth A. Seaman

[57] ABSTRACT

Print head for an electroerosion printer, with print electrodes arranged in rows and/or columns in a holder, and with at least one slightly shorter sensor electrode at the trailing edge of the print head to control the feeding of the print electrodes compensating their burning-off and/or abrasion, at least the sensor electrode (7) being inclined approximately in the direction of the median normal to the surface of the unprinted lateral surface of the trough-like depression.

11 Claims, 6 Drawing Figures

PRINT HEAD FOR AN ELECTROEROSION PRINTER

The invention relates to a print head for an electroerosion printer with print electrodes arranged in rows and/or columns in a holder, and with at least one sensor electrode that is arranged at the trailing end of the print head, and slightly shorter than the print electrodes for the control of the feeding of the print electrodes to compensate for burn-off and/or abrasion.

In such electroerosion printers the print electrodes of the print head are placed with a predetermined pressure onto a record carrier, e.g., an electrosensitive record carrier or a metallized record carrier. Because of the combination of the pressure exerted by the print head on the record carrier, the elasticity of the record carrier, and the deformability of the semi-resilient substrate on which the record carrier is placed, a trough-like depression results in the record carrier while it is being passed over by the print head in the longitudinal direction of the print head. Initially the pressure exerted by the individual electrodes onto the record carrier is not uniform. After a short operating period, the leading and the trailing electrodes are eroded to such an extent that the entire electrode arrangement has more or less adapted itself to the trough-like depression in the record carrier. At this time, the surface pressures exerted by the individual print electrodes on the record carrier are approximately the same. In the print operation proper, the print electrodes have to be realigned from time to time to compensate for abrasion or burn-off during operation. For that purpose, relatively long print electrode wires are used so that these can always be realigned over an extended period of operation. To compensate for electrode abrasion or burn-off, in order to maintain a print quality of maximum uniformity, (a result of a maximum uniform pressure of the electrodes on the record carrier), one or more sensor electrodes are disposed in a specific spatial relationship to the actual print electrodes to detect whether realignment of the print electrodes is required. Usually, the print head is placed onto the record carrier on the semi-resilient pressure plate in such a manner that the print electrodes and the sensor electrodes are perpendicular to the plane of the record carrier, and support themselves via the record carrier on the semi-resilient pressure plate.

A sensor electrode slightly shorter than the print electrodes is used to determine whether the print electrodes require realignment. For instance, a sensor electrode can be arranged in a slightly shifted position at the trailing edge of the print head so that it is placed very lightly against the unburnt side of the longitudinal trough-like depression formed by the pressure of the print electrodes. The sensor electrode which is now lightly placed onto the laterally rising surface of the trough-like depression, is then ground off in a kind of crescent shape, although much less than the print electrodes. This is due to the fact that the record carrier has irregularities, which the sensor electrode can briefly contact. However, these brief contacts are not intended to initiate a realignment. Only if the number and/or amplitudes of current pulses arising from more frequent or prolonged contact between sensor electrode and record carrier exceeds predetermined limits is there to be an electrode realignment.

The fact however that the sensor electrode rests on the rising side of the trough-like depression with a marginal zone only can initiate a premature electrode realignment signal, and if the print electrodes are realigned too soon the electrodes can exert an increased pressure onto the record carrier and the semi-resilient substrate, so that the trough-like depression deepens, with the consequence that the sensor electrode again contacts the now steeper side of the trough-like depression, and effects another feeding or realignment of the print electrode wires. Within a very short period, this can cause the destruction of the record carrier and/or the electrodes.

It is therefore the object of the invention to provide an electrode arrangement of the above specified type, by means of which such control-dependent instabilities can be substantially avoided. In a thus simplified system, the pressure exerted by the print head onto the record carrier can be kept substantially uniform.

According to the invention, this is achieved by a sensor electrode that is inclined approximately in the direction of the median surrace normal to the unprinted lateral side of the trough-like depression.

Further embodiments of the invention are specified in detail in the claims.

An embodiment of the invention will now be described in detail with reference to the accompanying drawings.

The drawings (which are not to scale) show the following:

Figure 1:
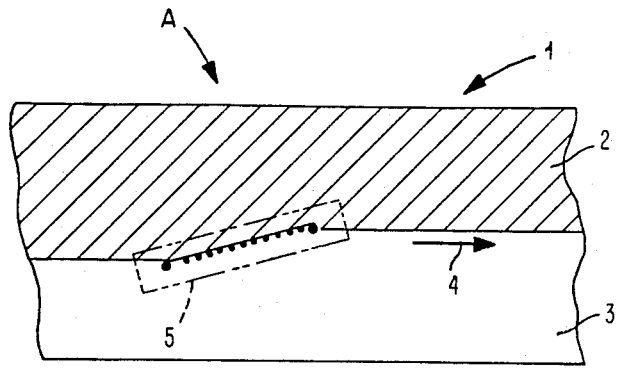
FIG. 1 shows a schematic view of a record carrier in the form of a web with a print head positioned thereabove.
Figure 2:
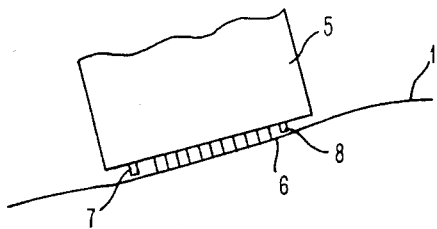
FIG. 2 shows a view of FIG. 1 in the direction of arrow A in FIG. 1.

FIG. 1 depicts a web-shaped record carrier 1 with an electrosensitive recording surface. The record carrier can be a metal registration paper, such as a substrate thinly coated with aluminum, with a lacquer layer being possibly provided beneath the aluminum layer. The record carrier shows in a schematic representation a printed-on layer 2 that is dark or black, and an unprinted layer 3 that is light. The printing direction is indicated by an arrow 4. The drawing also indicates a stylized print head 5, in the present case as a much simplified version illustrating only the electrode holder itself. As shown more clearly in FIG. 2, print head 5 comprises at its lower end a series of printing wires or print electrodes 6, and at the trailing edge a sensor electrode 7 and preferably also at the leading edge a sensor electrode 8.

Figure 3:
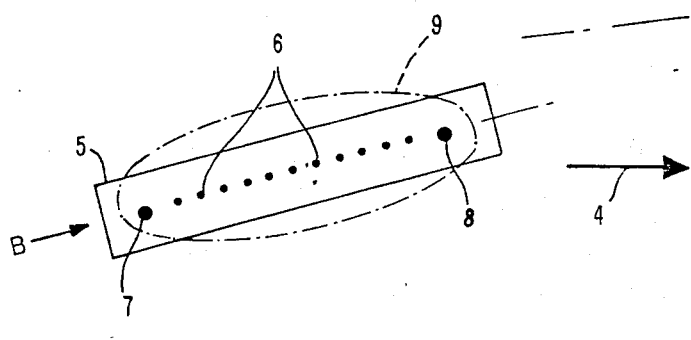
FIG. 3 shows a schematic representation of the print head and the trough-like depression caused thereby.
Figure 4:
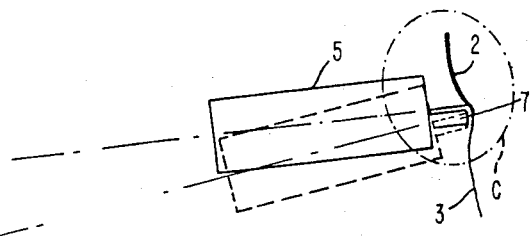
FIG. 4 shows a view of FIG. 3 in the direction of the arrow B in FIG. 3.
Figure 5:
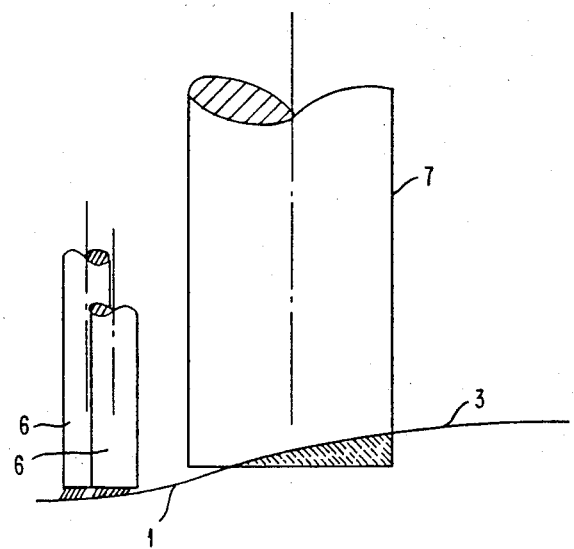
FIG. 5 shows an enlarged view of the part depicted in solid lines in FIG. 4.
Figure 6:
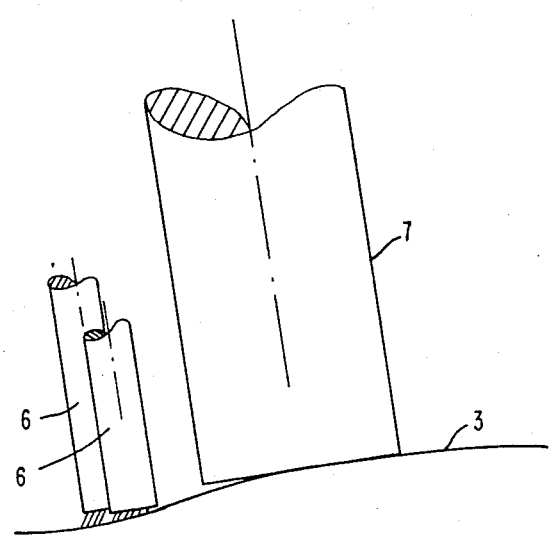
FIG. 6 shows an enlarged view of the part depicted in dashed lines in FIG. 4.

As explained in the introduction to the specification, the pressure exerted by the print head and its print electrodes onto the record carrier causes a kind of trough-like depression 9 on the record carrier which is depicted schematically by a dashed line. The printing direction is indicated by arrow 4. As indicated in the view of FIG. 4 which in FIG. 3 can be seen in the direction of arrow B, and in particular in FIGS. 5 and 6, the sensor electrode, if it is arranged perpendicularly, first rests lightly with its outer right-hand edge against the unprinted part 3 of record carrier web 1. Initially, the sensor electrode is not to have any contact with the record carrier. However, as explained above in the introduction, the surface roughness of the record carrier causes a slight abrasion of the sensor electrode so that it is ground off in the form of a crescent. As explained above, this initiates control processes to feed print electrodes unrelated to the actual burning-off or abrasion of print electrodes 6. The solution as presented by the invention is therefore depicted in FIG. 6. Actually, it would suffice merely to incline sensor electrode 7 slightly, but it has turned out to be advantageous to incline the holder carrying the electrodes rather than the electrodes themselves. In this manner, an optimum feed control is ensured since now the sliding angle and the depth of the deformation, and consequently the profile height is implemented by sensing as perpendicularly as possible the lateral slopes of the deformation. Print and sensor electrodes do not necessarily have to be inclined at the same angle to the normal to the surface of the undisturbed record carrier. The sensor electrodes can be inclined at an angle between 2° to 8° or 3° to 5° to the normal to the surface of the undisturbed record carrier.

In this manner, the sensing by the sensor electrode to initiate the electrode feed is rendered independent of the type of printing pattern, and becomes less sensitive to variations of the contact pressure. At the same time, the burn-off or abrasion residues produced during printing can be removed more easily from the zone of deformation (i.e., the trough-like depression), which is particularly favourable. The electrode abrasion achieved is much more uniform ensuring a less destructive shape. A widely feared forming of knife-shaped electrodes is substantially prevented thereby.

We claim:

1. In combination a print head and a record carrier for an electroerosion printer having print electrodes for printing on a surface of the record carrier and one sensor electrode for sensing the surface of the record carrier, said print head being movable in relation to said record carrier to print thereon said sensor electrode being slightly shorter than said print electrodes and being inclined to the normal of the surface of said record carrier in the direction of relative print head motion toward the unprinted surface of said record carrier.

2. The combination as claimed in claim 1 characterized in that at least the sensor electrode is inclined at an angle between approximately 2° and approximately 8° against the normal to the surface of the undisturbed record carrier, in a direction transverse to the longitudinal direction of the row of print electrodes.

3. The combination as claimed in claim 2 characterized in that the sensor electrode is inclined by approximately 3° to 5°.

4. The combination as claimed in claim 1 characterized in that all the print electrodes are also inclined.

5. In combination a print head and a recording medium for an electroerosion printer, with print electrodes arranged in rows in a holder, and with at least one sensor electrode at a trailing edge of said print head, said at least one sensor electrode being slightly shorter than said print electrodes and adapted to control the feeding of said print electrodes to compensate for erosion, such as by burn-off or abrasion, said at least one sensor electrode being inclined approximately in the direction of the recording medium normal to the unprinted lateral surface of a trough-like depression formed in the recording medium by said print head during printing operations.

6. The combination as claimed in claim 5 characterized in that all print electrodes are uniformly inclined.

7. The combination as claimed in any one of claims 1 through 6 characterized in that the sensor electrode and the print electrodes are inclined at the same angle.

8. The combination as claimed in claim 5 characterized in that the holder containing the print electrodes and the sensor electrodes is itself also inclined.

9. The combination as claimed in claim 5 characterized in that a sensor electrode is provided also at the leading edge.

10. A method of making marks on a record carrier comprising the steps of:
   mounting print electrodes along a line on a print head;
   moving the print head in a direction of movement toward an unprinted surface of the record carrier;
   mounting a sensor electrode to the print head, said sensor electrode being relatively shorter than the print electrodes and inclined in the direction of movement of the print head; and
   printing on the surface of the record carrier by engaging one or more of the electrodes at desired locations of the print head with respect to the record carrier.

11. An apparatus for printing on a record carrier comprising:
   a print head including means for moving the print head in a direction toward unprinted portions on the record carrier; and
   a sensor electrode mounted on the print head at an angle with respect to the print electrodes, angled in the direction of the unprinted record carrier.

* * * * *